US007348394B2

(12) United States Patent
Shyamroy et al.

(10) Patent No.: US 7,348,394 B2
(45) Date of Patent: Mar. 25, 2008

(54) METHODS FOR PREPARING TRANSPARENT ARTICLES FROM BIPHENOL POLYCARBONATE COPOLYMERS

(75) Inventors: Subarna Shyamroy, West Bengal (IN); Gokul Srinivasan, Bangalore (IN)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 11/261,265

(22) Filed: Oct. 28, 2005

(65) Prior Publication Data
US 2007/0100119 A1 May 3, 2007

(51) Int. Cl.
*C08G 64/00* (2006.01)

(52) U.S. Cl. .................. 528/196; 264/176.1; 264/219; 359/109; 528/198

(58) Field of Classification Search .............. 264/176.1, 264/219; 359/109; 528/196, 198
See application file for complete search history.

(56) References Cited

U.S. PATENT DOCUMENTS

| 4,994,547 | A | 2/1991 | Brunelle et al. ............ 528/201 |
| 5,122,905 | A | 6/1992 | Wheatley et al. ........... 359/586 |
| 5,122,906 | A | 6/1992 | Wheatley .................... 359/586 |
| 5,286,834 | A | 2/1994 | Sakashita et al. ........... 528/198 |
| 5,324,809 | A | 6/1994 | Sakashita et al. ........... 528/198 |
| 5,344,910 | A | 9/1994 | Sybert ........................ 528/201 |
| 5,401,826 | A | 3/1995 | Sakashita et al. ........... 528/204 |
| 5,418,315 | A | 5/1995 | Sakashita et al. ........... 528/196 |
| 5,470,938 | A | 11/1995 | Sakashita et al. ........... 528/198 |
| 5,484,875 | A | 1/1996 | Sakashita et al. ........... 528/198 |
| 5,532,331 | A | 7/1996 | Bales et al. ................. 528/196 |
| 6,548,623 | B2 | 4/2003 | Brunelle et al. ............ 528/196 |
| 6,747,119 | B2 * | 6/2004 | Brack et al. ................ 528/198 |
| 6,753,405 | B2 | 6/2004 | Kratschmer et al. ........ 528/196 |
| 6,790,929 | B2 | 9/2004 | Silvi et al. .................. 528/198 |
| 6,797,802 | B2 | 9/2004 | McCloskey et al. ........ 528/196 |
| 2003/0149223 | A1 | 8/2003 | McCloskey et al. ........ 528/196 |
| 2004/0087756 | A1 | 5/2004 | Ramesh et al. ............. 528/204 |
| 2005/0133697 | A1 | 6/2005 | Potyrailo et al. |

FOREIGN PATENT DOCUMENTS

WO    2004/060962 A1    7/2004

OTHER PUBLICATIONS

International Search Report issued by the International Searching Authority dated Apr. 27, 2007; 3 pages.
International Search Report for International Application No. PCT/US2006/040644 filed on Oct. 17, 2006.

* cited by examiner

*Primary Examiner*—Terressa Boykin

(57) ABSTRACT

A method for producing a transparent article is provided. The method comprises melt transesterifying in the presence of a transesterification catalyst and a monomer mixture to produce a biphenol polycarbonate copolymer product comprising greater than 45 mole percent of structural units derived from the biphenol by heating the monomer mixture to a temperature of greater than 340° C. to make the biphenol polycarbonate copolymer; and cooling the biphenol polycarbonate copolymer to produce the transparent article. The monomer mixture comprises the biphenol, at least one aromatic dihydroxy compound other than the biphenol, and an activated carbonic acid diester.

27 Claims, 1 Drawing Sheet

METHODS FOR PREPARING TRANSPARENT ARTICLES FROM BIPHENOL POLYCARBONATE COPOLYMERS

BACKGROUND

This disclosure relates generally to methods for producing polycarbonate copolymers comprising greater than 45 mole percent of structural units derived from a biphenol. Further, the disclosure relates to use of these polycarbonate copolymers for producing articles that have low haze, good ductility, transparency, and good chemical resistance.

Polycarbonates, such as bisphenol A polycarbonate have excellent mechanical properties, resistance to heat and transparency. They are therefore used in a wide variety of applications like automotive parts, optical storage media, industrial components, and the like. However, there are other applications in industries, such as the medical industry, performance packaging industry, automotive industry, and the like that require in addition to the above-mentioned properties, increased resistance to solvents and other chemicals. As the amount of structural units derived from the biphenol increases, the tendency of the copolymer to crystallize also increases. However, when crystallization sets in, the polymer usually turns hazy or opaque.

Therefore there is a need for effective methods for producing transparent articles comprising biphenol polycarbonate copolymers, which have a higher level of structural units, that is, greater than 45 mole percent of structural units derived from a biphenol. Such copolymers are valuable for producing articles having desirable properties, such as transparency, low haze, good mechanical properties, such as modulus and ductility; low color, and chemical/solvent resistance effective for applications in the medical industry, performance packaging industry, the automotive industry, and the like.

SUMMARY

Disclosed herein are methods for producing biphenol polycarbonate articles and copolymers therefore having a high (greater than about 45 mole percent) mole percent of structural units derived from a biphenol and are visually transparent.

In one aspect of the disclosure, a method for producing a transparent article is provided. The method comprises: melt transesterifying in the presence of a transesterification catalyst and a monomer mixture to produce a biphenol polycarbonate copolymer product comprising greater than 45 mole percent of structural units derived from the biphenol by heating the monomer mixture to a temperature of greater than 340° C. to make the biphenol polycarbonate copolymer; and cooling the biphenol polycarbonate copolymer to produce the transparent article. The monomer mixture comprises the biphenol, at least one aromatic dihydroxy compound other than the biphenol, and an activated carbonic acid diester.

In another embodiment, a method for producing a transparent article comprises heating a monomer mixture in the presence of a transesterification catalyst at a temperature in a range between about 100° C. and about 200° C. to produce a mixture comprising biphenol polycarbonate oligomer and a solvent derived from the activated carbonic acid diester. The monomer mixture comprises a biphenol, at least one aromatic dihydroxy compound other than the biphenol, and an activated carbonic acid diester. The mixture is then fed to an extruder and extruded to produce a biphenol polycarbonate copolymer product comprising greater than 45 mole percent of structural units derived from the biphenol. The biphenol polycarbonate copolymer product is then heated to at least 340° C. for a period of time sufficient to render the copolymer product transparent upon cooling; and then cooling the biphenol polycarbonate copolymer product to produce the transparent article.

In still another aspect of the disclosure, a method for producing a transparent article comprises melt transesterifying a monomer mixture in the presence of a transesterification catalyst to produce a biphenol polycarbonate copolymer product comprising greater than 45 mole percent of structural units derived from a biphenol. The monomer mixture comprises the biphenol, at least one aromatic dihydroxy compound other than the biphenol, and an activated carbonic acid diester. The biphenol polycarbonate copolymer product is then heated to a processing temperature of at least 350° C., and then cooled to produce the transparent article.

In still yet another embodiment, a method for producing a transparent biphenol polycarbonate copolymer comprises melt transesterifying a monomer mixture in the presence of a transesterification catalyst to produce a biphenol polycarbonate copolymer product comprising greater than 45 mole percent of structural units derived from a biphenol by heating the mixture to a temperature above 340° C.; and cooling to produce the transparent copolymer. The monomer mixture comprises the biphenol, at least one aromatic dihydroxy compound other than the biphenol, and an activated carbonic acid diester.

In another embodiment, a method for producing a biphenol polycarbonate copolymer comprises melt transesterifying a monomer mixture in the presence of a transesterification catalyst to produce a biphenol polycarbonate copolymer product comprising greater than 45 mole percent of structural units derived from a biphenol by heating the monomer mixture to a temperature of greater than 350° C. to make the biphenol polycarbonate copolymer, and then cooling the biphenol polycarbonate copolymer product. The monomer mixture comprises the biphenol, at least one aromatic dihydroxy compound other than the biphenol, and an activated carbonic acid diester.

In other embodiments of the disclosure, biphenol polycarbonate copolymers and transparent articles prepared in accordance with the methods described above are provided.

The present disclosure may be understood more readily by reference to the following detailed description of the various features of the disclosure and the examples included therein.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

The FIGURE is a differential scanning calorimetry trace showing the heating and the cooling curves for a biphenol polycarbonate copolymer comprising a 50:50 relative mole ratio of structural units derived from 4,4'-biphenol and bisphenol A, respectively.

DETAILED DESCRIPTION

Figure 1:
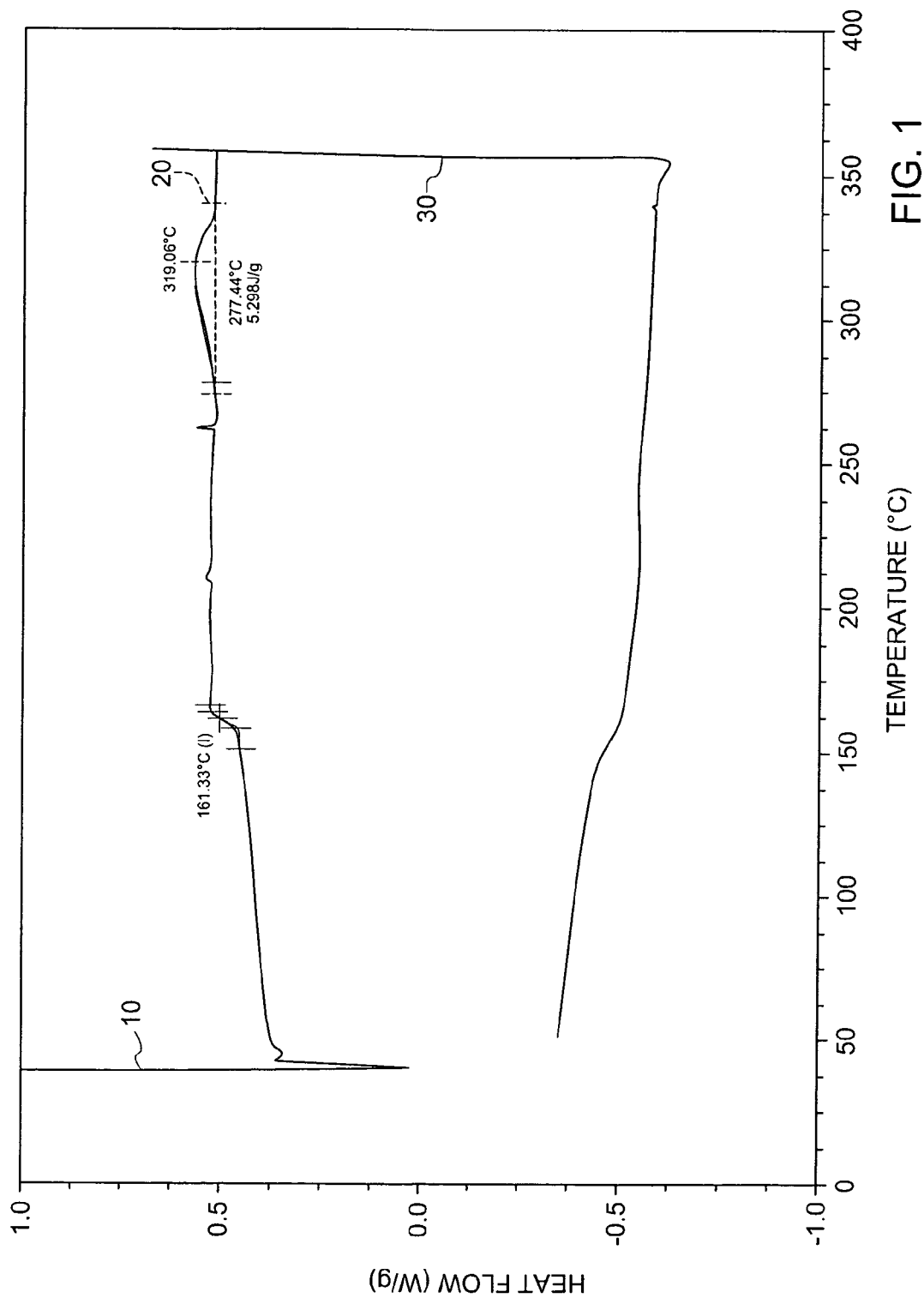

The previously described embodiments are useful for producing biphenol polycarbonate copolymers having greater than 45 mole percent of structural units derived from a biphenol incorporated in the copolymer backbone. The copolymers prepared by these methods are useful for producing articles that have transparency and/or low haze in an embodiment, and high thermal stability, good mechanical properties, such as ductility and modulus, and chemical resistance in another embodiment. The present disclosure may be understood more readily by reference to the following detailed description of preferred embodiments and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "aliphatic radical" refers to an organic radical having a valence of at least one comprising a linear or branched array of atoms which is not cyclic. Aliphatic radicals are defined herein to comprise at least one carbon atom. The array of atoms forming the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, a suitable aliphatic radical is the 4-methylpent-1-yl radical, which is a $C_6$ aliphatic radical comprising a methyl group. Similarly, the 4-nitrobut-1-yl group is a $C_4$ aliphatic radical comprising a nitro functional group. Other suitable aliphatic radicals include a haloalkyl group that comprises one or more halogen atoms which may be the same or different. Suitable halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl; difluorovinylidene; trichloromethyl, bromodichloromethyl, bromoethyl, 2-bromotrimethylene (e.g. —$CH_2CHBrCH_2$—), and the like. Further examples of suitable aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl (i.e. —CHO), hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl (i.e. $CH_3OCO$—), nitromethyl (i.e. —$CH_2NO_2$), thiocarbonyl, trimethylsilyl (i.e. $(CH_3)_3Si$—), t-butyldimethylsilyl, trimethyoxysilylpropyl (i.e. $(CH_3O)_3SiCH_2CH_2CH_2$—), vinyl, vinylidene, and the like. By way of further example, a $C_1$-$C_{10}$ aliphatic radical contains at least one but no more than 10 carbon atoms.

As used herein, the term "aromatic radical" refers to an array of atoms having a valence of at least one comprising at least one aromatic group. The aromatic radical may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include non-aromatic components. For example, a benzyl group is an aromatic radical that comprises a phenyl ring (the aromatic group) and a methylene group (the non-aromatic component). Similarly a tetrahydronaphthyl radical is an aromatic radical comprising an aromatic group ($C_6H_3$) fused to a non-aromatic component —$(CH_2)_4$—. The "aromatic radical" can encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl alkyl group. Similarly, the 2-nitrophenyl group is a $C_6$ aromatic radical comprising a nitro functional group. Suitable aromatic radicals may include halogenated aromatic radicals such as trifluoromethylphenyl, hexafluoroisopropylidenebis(4-phen-1-yloxy) (i.e. —$OPhC(CF_3)_2PhO$—), chloromethylphenyl; 3-trifluorovinyl-2-thienyl; 3-trichloromethylphen-1-yl (i.e. 3-$CCl_3Ph$), 4(3-bromoprop-1-yl)phen-1-yl (i.e. $BrCH_2CH_2CH_2Ph$), and the like. Further examples of aromatic radicals include 4-allyloxyphen-1-oxy, 4-aminophen-1-yl (i.e. $H_2NPh$), 3-aminocarbonylphen-1-yl (i.e. $NH_2COPh$), 4-benzoylphen-1-yl, dicyanoisopropylidenebis(4-phen-1-yloxy) (i.e. —$OPhC(CN)_2PhO$—), 3-methylphen-1-yl, methylenebis(phen-4-yloxy) (i.e. —$OPhCH_2PhO$—), 2-ethylphen-1-yl, phenylethenyl, 3-formyl-2-thienyl, 2-hexyl-5-furanyl; hexamethylene-1,6-bis(phen-4-yloxy) (i.e. —$OPh(CH_2)_6PhO$—); 4-hydroxymethylphen-1-yl (i.e. 4-$HOCH_2Ph$), 4-mercaptomethylphen-1-yl (i.e. 4-$HSCH_2Ph$), 4-methylthiophen-1-yl (i.e. 4-$CH_3SPh$), 3-methoxyphen-1-yl, 2-methoxycarbonylphen-1-yloxy (e.g. methyl salicyl), 2-nitromethylphen-1-yl (i.e. $PhCH_2NO_2$), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one and comprising an array of atoms which is cyclic but not aromatic. As defined herein a "cycloaliphatic radical" does not contain an aromatic group and may further include one or more noncyclic components. For example, a cyclohexylmethyl group ($C_6H_{11}CH_2$—) is a cycloaliphatic radical that comprises a cyclohexyl ring (the array of atoms is cyclic but not aromatic) and a methylene group (the noncyclic component). The cycloaliphatic radical may further include heteroatoms such as nitrogen, sulfur, selenium, silicon and oxygen, or may be composed exclusively of carbon and hydrogen. In addition, the cycloaliphatic radical can encompass a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A suitable cycloaliphatic radical may also comprise one or more halogen atoms which may be the same or different. Suitable halogen atoms include, for example; fluorine, chlorine, bromine, and iodine. Suitable cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene2,2-bis (cyclohex-4-yl) (i.e. —$C_6H_{10}C(CF_3)_2$ $C_6H_{10}$—), 2-chloromethylcyclohex-1-yl; 3-difluoromethylenecyclohex-1-yl; 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}$—), and the like. Further examples of cycloaliphatic radicals include 4-allyloxycyclohex-1-yl, 4-aminocyclohex-1-yl (i.e. $H_2NC_6H_{10}$—), 4-aminocarbonylcyclopent-1-yl (i.e. $NH_2COC_5H_8$—), 4-acetyloxycyclohex-1-yl, 2,2-dicyanoisopropylidenebis(cyclohex-4-yloxy) (i.e. —$OC_6H_{10}C(CN)_2C_6H_{10}O$—), 3-methylcyclohex-1-yl, methylenebis(cyclohex-4-yloxy) (i.e. —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (i.e. —O $C_6H_{10}(CH_2)_6C_6H_{10}O$—); 4-hydroxymethylcyclohex-1-yl (i.e. 4-$HOCH_2C_6H_{10}$—), 4-mercaptomethylcyclohex-1-yl (i.e. 4-$HSCH_2C_6H_{10}$—), 4-methylthiocyclohex-1-yl (i.e. 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl (i.e. $NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}$—), 4-vinylcyclohexen-1-yl, vinylidenebis (cyclohexyl), and the like.

As used herein, the term "biphenol polycarbonate oligomer" refers to a polycarbonate containing structural units derived from a biphenol, at least one aromatic dihydroxy compound other than the biphenol, and an activated carbonic acid diester, and having a lower molecular weight than the final biphenol polycarbonate copolymer product. The biphenol polycarbonate oligomer further polymerizes to produce the biphenol polycarbonate copolymer product. When the oligomeric polycarbonate or the copolymer product is soluble in a solvent, its number average or weight average molecular weight can be determined by using gel permeation chromatography and polystyrene standards. When the oligomeric polycarbonate or the copolymer product is insoluble in a solvent suitable for molecular weight determination, its zero shear rate viscosity ($\eta_0$) can be determined at temperatures sufficient to ensure that the materials are fully melted. The value of $\eta_0$ is taken as the upper limiting viscosity in the low frequency region of the spectrum.

As used herein, when describing the oligomeric polycarbonate, the biphenol polycarbonate copolymer product, or the articles from the copolymer product, the expression "structural units derived from a biphenol" means a repeat unit incorporated into the polymer chain by reaction of a biphenol with an activated carbonic acid diester, for example the reaction of 4,4'-dihydroxybiphenyl with bis(methyl salicyl)carbonate. Likewise, the expression "structural units derived from at least one dihydroxy aromatic compound other than the biphenol" means a repeat unit incorporated into the polymer chain by reaction of at least one dihydroxy aromatic compound, other than the biphenol, with an activated carbonic acid diester, an example being the reaction of bisphenol A with bis(methyl salicyl)carbonate.

As used herein, the term "solvent" can refer to a single solvent or a mixture of solvents.

As used herein, the term "melt polycarbonate" refers to a biphenol polycarbonate copolymer comprising structural units made by the transesterification of an activated carbonic acid diester, such as for example, the reaction of bis(methylsalicyl)carbonate with a biphenol and at least one dihydroxy aromatic compound other than the biphenol.

As used herein, the terms "diaryl carbonate" and "ester substituted diaryl carbonate" are used interchangeably with the terms "aromatic carbonate" and "ester substituted aromatic carbonate" respectively.

The terms "double screw extruder" and "twin-screw extruder" are used interchangeably herein. The terms "formula" and "structure" are used interchangeably herein. The term "monofunctional phenol" means a phenol comprising a single reactive hydroxy group. The terms "vent port" and "vent" are used interchangeably herein. The term "atmospheric vent" as used herein is meant to indicate a vent that is operated at or near atmospheric pressure.

As used herein, "BPA" stands for bisphenol A or 2,2-bis (4-hydroxyphenyl)propane; "HQ" stands for hydroquinone; 1,4-HQ stands for 1,4-hydroquinone; "MeHQ" stands for as 2-methyl-1,4-hydroquinone; "PPPBP" stands for 2-phenyl-3,3-bis(4-hydroxyphenyl)phthalimidine; "BP" stands for biphenol, 4,4'-BP stands for 4,4'-biphenol; "RS" stands for resorcinol, "DPC" stands for diphenyl carbonate, and "BMSC" stands for bis(methylsalicyl)carbonate, also sometimes called as bis(o-methoxycarbonylphenyl)carbonate).

As defined herein, the term "maximum melting temperature" denotes the temperature at which the crystalline domains present in a biphenol polycarbonate copolymer prepared by the transesterification reaction of a biphenol, at least one dihydroxy aromatic compound other than the biphenol, and an activated carbonic acid diester melts completely, as determined by differential scanning calorimetry (DSC) by using a heating rate of 20° C. per minute. In a DSC curve, the temperature at which the heat flow value reaches the baseline of the DSC curve indicates that the sample has completely melted, and will give the maximum melting temperature. For example, referring to the DSC heating curve (10) in the FIGURE, the maximum melting temperature (20) for a 4,4'-BP-BPA copolymer prepared from 4,4'-BP, BPA, and DPC by the transesterification step, and having a 50:50 mole ratio of structural units derived from 4,4'-BP and BPA, respectively, is around 335° C. at a heating rate of 20° C. per minute. Hence, in an embodiment, the temperature to produce the desired biphenol polycarbonate copolymer article in accordance with the present disclosure will be about 5-20° C. higher than the maximum melting point of the polycarbonate copolymer prepared as described above (i.e., 340-355° C.). In an embodiment, the maximum melting temperature of the biphenol polycarbonate copolymer products disclosed herein is in a range from about 260° C. to about 360° C. Biphenol polycarbonate copolymers showing a melting behavior are generally opaque materials.

The term "phenylene radical" refers to a benzene ring having two open positions available for substitution. Examples, include phenylene, alkylphenylene, halophenylene, etc. The term "biphenylene" refers to a biphenyl group having two open positions available for substitution. Examples include 1,1-biphenyl-4,4'-ylene; 3,3'-dimethyl-1, 1-biphenyl-4,4'-ylene; 3,3'-dioctyl-1,1-biphenyl-4,4'-ylene, and the like.

As defined herein, the term "mole percent of structural units" means the moles of the BP or of the aromatic dihydroxy compound comonomer that is incorporated in the form of structural units in the backbone of the polymer chain. It does not mean the number of moles or the mole ratio of the starting monomers taken as the charge to produce the polymer, as will be evident from the experimental results discussed further below. For example, a copolymer comprising 50 mole percent each of structural units derived from 1,4-BP and BPA would mean that 50 mole percent each of 1,4-BP and BPA have reacted and are included as structural units in the polymer chain.

The biphenol polycarbonate copolymer products and transparent articles made therefrom comprise greater than 45 mole percent of structural units derived from a biphenol. The same biphenol or different biphenols can be used. Suitable biphenols that can be used are represented by structure (I),

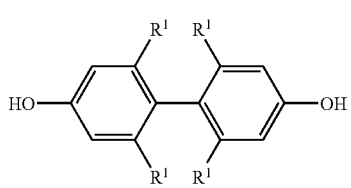

(I)

wherein each $R^1$ is independently at each occurrence a hydrogen radical, a halogen, a monovalent $C_1$-$C_{12}$ aliphatic radical, a $C_3$-$C_{10}$ cycloaliphatic radical, or a $C_3$-$C_{10}$ aromatic radical. In one embodiment, the biphenol monomer comprises at least one of 4,4'dihydroxy-1,1-biphenyl (or 4,4'-biphenol); 4,4'-dihydroxy-3,3'-dimethyl-1,1-biphenyl; and 4,4'-dihydroxy-3,3'-dioctyl-1,1-biphenyl. In a particular embodiment, 4,4'dihydroxy-1,1-biphenyl can be used. Other examples of biphenols include 3,3'-dichloro-4,4'-dihydroxy-1,1'-biphenyl, 3,3'-difluoro-4,4'-dihydroxy-1,1'-biphenyl 3,3'-bis(trifluoromethyl)-4,4'-dihydroxy-1,1'-biphenol, and the like. Unsymmetrical biphenols can also be used. The biphenols may be obtained commercially or prepared using known synthetic methods.

The biphenol polycarbonate copolymer product further comprises less than 55 weight percent of structural units derived from at least one other aromatic dihydroxy compound other than the biphenol. Aromatic dihydroxy compounds other than the biphenol have the general formula (II):

HO-[A]-OH    (II)

wherein [A] is a divalent aromatic radical. The moiety [A] can be represented by a structure (III):

HO-[$G^1$]$_t$-[E]$_s$-[$G^1$]$_u$-OH    (III)

wherein each $G^1$ is independently at each occurrence a $C_6$-$C_{20}$ aromatic radical; E is independently at each occurrence a bond, a $C_3$-$C_{20}$ cycloaliphatic radical, a $C_3$-$C_{20}$ aromatic radical, a $C_1$-$C_{20}$ aliphatic radical, a nitrogen-containing linkage, a silicon-containing linkage, a sulfur-containing linkage, a selenium-containing linkage, a phosphorus-containing linkage, or an oxygen atom; "t" is a number greater than or equal to one; "s" is either zero or one; and "u" is a whole number including zero. In various embodiments, "t" can have values from 1 to 10, from 1 to 5, from 1 to 3, and preferably 1. Similarly, in various embodiments "u" can have values from 1 to 10, from 1 to 5, from 1 to 3, and preferably 1.

As defined herein, a "nitrogen-containing linkage" includes tertiary nitrogen-containing linkages. As defined herein, a "silicon-containing linkage" includes silane type linkages and siloxane type linkages. As defined herein, a "sulfur-containing linkage" includes a sulfide group, a sulfoxide group, and a sulfone group. As defined herein, a "selenium-containing linkage" includes a selenide group, a selenoxide group, and a selenone group. As defined herein, a "phosphorus-containing linkage" is defined to include trivalent, tetravalent, or pentavalent phosphorus, some non-limiting examples of which include the phosphonyl and phosphinyl type linkages. The phosphorus atom may be bonded through carbon-containing groups, oxygen-containing groups, sulfur-containing groups, or selenium-containing groups. In some embodiments, the phosphorus atom may be bonded to other inorganic groups, such as for example hydroxy groups or their metal salt derivatives, such as ONa, OK, OLi, and the like. The phosphorus atom may also be bonded through oxygen, sulfur, or selenium to organic groups, such as $C_3$-$C_{20}$ cycloaliphatic radicals, $C_3$-$C_{20}$ aromatic radicals, or $C_1$-$C_{20}$ aliphatic radicals.

Some illustrative, non-limiting examples of aromatic dihydroxy compounds include, but are not intended to be limited to, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl) ethane, 1,1-bis(4-hydroxy-2-chlorophenyl)ethane, BPA, 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl) propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3, 5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3- bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl)cyclohexane (DMBPC), 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimidine (PPPBP), 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'-(3,3,5-trimethylcyclohexylidene)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzene 2,4'-dihydroxyphenyl sulfone, 4,4'-dihydroxydiphenylsulfone (BPS), bis(4-hydroxyphenyl)methane, 2,6-dihydroxy naphthalene; resorcinol, $C_1$-$C_3$ alkyl-substituted resorcinols, 3-(4-hydroxyphenyl)-1,1,3-trimethylindan-5-ol, 1-(4-hydroxyphenyl)-1,3,3-trimethylindan-5-ol, 1,4-hydroquinone, 2-methyl-1,4-hydroquinone, and 2,2,2',2'-tetrahydro-3,3,3',3'-tetramethyl-1,1'-spirobi[1H-indene]-6,6'-diol (SBI). In a particular embodiment, the aromatic dihydroxy compound is BPA. In another embodiment, the aromatic dihydroxy compound is selected from the group consisting of bisphenol A, 2,2,2',2'-tetrahydro-3,3,3',3'-tetramethyl-1,1'-spirobi[1H-indene]-6,6'-diol, resorcinol, 2-phenyl-3,3-bis(4-hydroxyphenyl)phthalimidine, and 1,1-bis(4'-hydroxy-3'methylphenyl)cyclohexane.

In some embodiments, at least one hydroquinone can be used as a comonomer to produce transparent articles comprising the biphenol polycarbonate copolymers. Non-limiting examples of hydroquinone comonomers include 1,4-hydroquinone, 2-methyl-1,4-hydroquinone, and the like.

Carbonic acid diesters have the general formula (IV), $$(ZO)_2C=O \qquad (IV)$$

wherein each Z is independently an unsubstituted or substituted aryl radical. Suitable examples of carbonic acid diesters include, but are not intended to be limited to, ditolyl carbonate, m-cresyl carbonate, dinaphthyl carbonate, diphenyl carbonate, diethyl carbonate, dimethyl carbonate, dibutyl carbonate, dicyclohexyl carbonate, and combinations of two or more carbonic acid diesters thereof. Diphenyl carbonate is widely used as a carbonic acid diester due to its low cost and ready availability on a commercial scale. If two or more of the carbonic acid diesters listed above are utilized, preferably one of the carbonic acid diesters is diphenyl carbonate.

Suitable carbonic acid diesters include the group of "activated aromatic carbonates". As used herein, the term "activated aromatic carbonate" is defined as a diaryl carbonate that is more reactive than diphenyl carbonate in a transesterification reaction. Such activated aromatic carbonates can also be represented by formula (IV), wherein each Z is an aryl radical having 6 to 30 carbon atoms. The activated carbonates have the general formula (V),

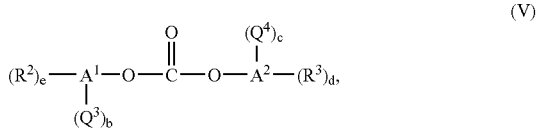

wherein $A^1$ and $A^2$ are each independently aromatic rings each having a number of positions available for substitution; $R^2$ and $R^3$ are independently at each occurrence a halogen, a cyano group, a nitro group, a $C_1$-$C_{20}$ alkyl group, a $C_4$-$C_{20}$ cycloalkyl group, a $C_4$-$C_{20}$ aromatic group, a $C_1$-$C_{20}$ alkoxy group, a $C_4$-$C_{20}$ cycloalkoxy group, a $C_4$-$C_{20}$ aryloxy group, a $C_1$-$C_{20}$ alkylthio group, a $C_4$-$C_{20}$ cycloalkylthio group, a $C_4$-$C_{20}$ arylthio group, a $C_1$-$C_{20}$ alkylsulfinyl group, a $C_4$-$C_{20}$ cycloalkylsulfinyl group, a $C_4$-$C_{20}$ arylsulfinyl group, a $C_1$-$C_{20}$ alkylsulfonyl group, a $C_4$-$C_{20}$ cycloalkylsulfonyl group, a $C_4$-$C_{20}$ arylsulfonyl group, a $C_1$-$C_{20}$ alkoxycarbonyl group, a $C_4$-$C_{20}$ cycloalkoxycarbonyl group, a $C_4$-$C_{20}$ aryloxycarbonyl group, a $C_2$-$C_6$ alkylamino group, a $C_6$-$C_{60}$ cycloalkylamino group, a $C_5$-$C_{60}$ arylamino group, a $C_1$-$C_{40}$ alkylaminocarbonyl group, a $C_4$-$C_{40}$ cycloalkylaminocarbonyl group, a $C_4$-$C_{40}$ arylaminocarbonyl group, and a $C_1$-$C_{20}$ acylamino group; "d" and "e" are independently integers from and including 0 to the number of positions available for substitution on $A^1$ and $A^2$ respectively; $Q^3$ and $Q^4$ are each independently activating groups selected from the group consisting of an alkoxycarbonyl group, a formyl group, a halogen atom, a nitro group, an amide group, a sulfone group, a sulfoxide group, and an imine group, an amidine group, and aminocarbonyl and amidine moieties having structures (VI) and (VII):

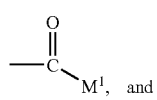

(VI)

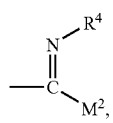

(VII)

wherein $M^1$ and $M^2$ are independently N-alkyl, N,N-dialkyl, N-aryl, N,N-diaryl, or N-alkylaryl, N,N-dialkylaryl, and $R^4$ is an alkyl group or an aryl group; and "b" and "c" are independently integers from and including 0 to the number of positions available for substitution on $A^1$ and $A^2$ respectively, provided b+c is greater than or equal to 1. One or more such activated aromatic carbonates may be used for forming the biphenol polycarbonate copolymers and the transparent articles therefrom.

Specific non-limiting examples of activated aromatic carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, wherein the substitution number and type on $A^1$ and $A^2$ are different, can also be used. In a particular embodiment, the activated aromatic carbonate is an ester-substituted diaryl carbonate having the formula (VIII)

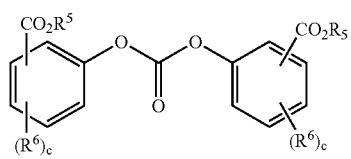

(VIII)

wherein $R^5$ is independently at each occurrence a $C_1$-$C_{20}$ alkyl radical, $C_4$-$C_{20}$ cycloalkyl radical, or $C_4$-$C_{20}$ aromatic radical; $R^6$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and c is independently at each occurrence an integer 0-4. At least one of the substituents $CO_2R^5$ is preferably attached in the ortho position of formula (VIII).

Examples of preferred ester-substituted diaryl carbonates include, but are not limited to, bis(methylsalicyl)carbonate (CAS Registry No. 82091-12-1) (also known as BMSC or bis(o-methoxycarbonylphenyl)carbonate), bis(ethyl salicyl) carbonate, bis(propyl salicyl)carbonate, bis(butylsalicyl)carbonate, bis(benzyl salicyl)carbonate, bis(methyl 4-chlorosalicyl)carbonate and the like. In an embodiment, BSMC is used in melt polycarbonate synthesis. Mixtures of DPC and BMSC can also be used.

Some non-limiting examples of non-activating groups which, when present in an ortho position, would not be expected to result in activated carbonates are alkyl, cycloalkyl or cyano groups. Some specific and non-limiting examples of non-activated carbonates include bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diaryl carbonates, wherein one aryl group is activated and one aryl is inactivated, can be useful if the activating group renders the diaryl carbonate more reactive than diphenyl carbonate.

One method for determining whether a certain diaryl carbonate is activated or is not activated is to carry out a model melt transesterification reaction between the particular diaryl carbonate and a phenol such as para-(1,1,3,3-tetramethyl)butyl phenol (and comparing the relative reactivity against diphenyl carbonate). This phenol is preferred because it possesses only one reactive site, possesses a low volatility, and possesses a similar reactivity to bisphenol-A. The model melt transesterification reaction is carried out at temperatures above the melting points of the particular diaryl carbonate and phenol in the presence of a transesterification catalyst, which is usually an aqueous solution of sodium hydroxide or sodium phenoxide. Preferred concentrations of the transesterification catalyst are at about 0.001 mole percent based on the number of moles of the phenol or diaryl carbonate. Although a preferred reaction temperature is 200° C., the choice of reaction conditions as well as catalyst concentration can be adjusted depending on the reactivity and melting points of the reactants to provide a convenient reaction rate. The reaction temperature is preferably maintained below the degradation temperature of the reactants. Sealed tubes can be used if the reaction temperatures cause the reactants to volatilize and affect the reactant molar balance. A determination of an equilibrium concentration of the reactants is accomplished through reaction sampling during the course of the reaction with subsequent analysis of the reaction mixture using well-known detection methods such as HPLC (high pressure liquid chromatography). Particular care needs to be taken so that the reaction does not continue after the sample has been removed from the reaction vessel. This is accomplished by cooling down the sample in an ice bath and by employing a reaction quenching acid, such as acetic acid in the water phase of the HPLC solvent system. It may also be desirable to introduce the reaction quenching acid directly into the reaction sample in addition to cooling the reaction mixture. A preferred concentration for the reaction quenching acid, e.g., acetic acid in the water phase of the HPLC solvent system, is about 0.05 mole percent. The equilibrium constant is then determined from the concentration of the reactants and product after equilibrium is reached. Equilibrium is assumed to have been reached when the concentration of components in the reaction mixture reach a point of little or no change on sampling of the reaction mixture. The equilibrium constant can be determined from the concentration of the reactants and products by methods well known to those skilled in the art. A diaryl carbonate which possesses a relative equilibrium constant ($K_{diarylcarbonate}/K_{diphenylcarbonate}$) of greater than 1 is considered to possess a greater reactivity than diphenyl carbonate and is a suitable activated aromatic carbonate for use in the present disclosure, whereas a diaryl carbonate which possesses an equilibrium constant of 1 or less is considered to possess the same or have less reactivity than diphenyl carbonate and is considered not to be activated. It is generally preferred to employ an activated aromatic carbonate with very high reactivity compared to diphenyl carbonate when conducting transesterification reactions. Preferred are activated aromatic carbonates with an equilibrium constant greater than at least 1,000 times that of diphenyl carbonate.

As noted above, biphenol polycarbonate copolymers comprising greater than 45 mole percent of structural units derived from a biphenol can be prepared by melt transesterifying a monomer mixture comprising the biphenol, at least one aromatic dihydroxy compound other than the biphenol, and an activated carbonic acid diester in the presence of a transesterification catalyst. In an embodiment, the monomer mixture and the catalyst together are heated to a temperature above 340° C.; and then cooled to produce the biphenol polycarbonate copolymer. In another embodiment, the reaction temperature sufficient to produce the biphenol polycarbonate copolymer product is about 5° C. to about 20° C. greater than the maximum melting temperature of a biphenol polycarbonate copolymer produced from the transesterification step and having a maximum melting temperature, wherein the biphenol polycarbonate copolymer product and the biphenol polycarbonate copolymer having the maximum melting temperature each comprises (i) greater than 45 mole percent of structural units derived from the biphenol, (ii) less than 55 mole percent of structural units derived from the at least one aromatic dihydroxy compound other than the biphenol; and (iii) carbonate structural units derived from the activated carbonic acid diester. Hence in another embodiment, the transesterification step is carried out at a temperature above 350° C. to produce the biphenol polycarbonate copolymer products.

The methods described above are useful for producing biphenol polycarbonate copolymers that are visually transparent. By the term "visually transparent" is meant that the copolymers and the articles do not have any apparent haze, as seen through the human eye. In absolute terms, it is expected that the visually transparent copolymers and articles produced thereon by the processes described herein have a haze value less than 5 as measured in accordance with ASTM D1003, which is generally used to measure percent light transmittance and haze on molded plaques. Further the methods are useful for preparing biphenol polycarbonate copolymers having greater than 46 mole percent of structural units derived from the BP in an embodiment, greater than 47 mole percent of structural units derived from the BP in another embodiment, and greater than 48 mole percent of structural units derived from the BP in yet another embodiment.

As noted above, the method for producing a transparent article comprises melt transesterifying a monomer mixture (described above) in the presence of a transesterification catalyst to produce a biphenol polycarbonate copolymer product comprising greater than 45 mole percent of structural units derived from the biphenol by heating the monomer mixture to a temperature of greater than 340° C. to make the biphenol polycarbonate copolymer; and then cooling the biphenol polycarbonate copolymer to produce the transparent article. In another embodiment, the biphenol polycarbonate copolymer is first formed, and then heated to a temperature of at least 350° C., followed by cooling to produce the transparent article.

The biphenol polycarbonate copolymer products and the transparent articles therefrom may also comprise other structural units derived from the activated aromatic carbonate. These structural units may be end groups incorporated into the polycarbonate. The polycarbonate copolymer product comprising carbonate units derived from the activated carbonate of structure (IV) preferably comprises at least one end group derived from the activated carbonate. In one embodiment, the end groups which are derived from the activated aromatic carbonate have structure (IX),

wherein $Q^3$ is an ortho-positioned activating group; $A^1$ is an aromatic ring, e is a natural numbers of 1 to the number of replaceable hydrogen groups substituted on the aromatic ring A; $R^2$ is a substituent group selected from the group consisting of alkyl, cycloalkyl, alkoxy, aryl, cyano, nitro, and halogen; b is a whole number of from 0 to the number of replaceable hydrogen groups on the aromatic ring minus e; and $Q^3$ is a radical independently selected from the group consisting of (alkoxycarbonyl)aryl groups, halogens, nitro groups, amide groups, sulfone groups, sulfoxide groups, or imine groups with structures (X), (XI), and (XII),

wherein X comprises halogen or $NO_2$, "e" is independently an integer from and including 0 to the number of positions available for substitution on $A^1$, M and M' independently comprises N-alkyl, N-aryl, or N-alkyl aryl; $R^4$ comprises alkyl or aryl when b is 1; and b has a value of 0 or 1.

Particularly when the polycarbonate copolymer product is prepared via melt polymerization of an ester-substituted aromatic carbonate, such as for example BMSC, with a dihydroxy aromatic compound (e.g. BPA), the copolymers disclosed herein may further comprise very low levels of structural features that arise from side reactions taking place during the melt polymerization reaction. One such structural feature has a structure (XIII),

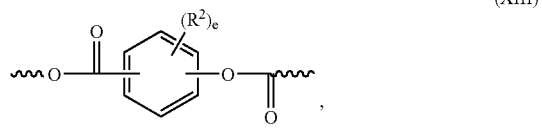
(XIII)

wherein $R^2$ and "e" are defined as in structure (V). Note that "e" is an integer from and including 0 to 4, 4 being the maximum number of positions available for substitution in structure (XIII).

Structure (XIII) is termed an "internal ester-carbonate linkage" or "kink". Without wishing to be bound by any theory, it is thought that structure (XIII) may arise by reaction of an ester-substituted phenol by-product, for example methyl salicylate, at its ester carbonyl group with a dihydroxy aromatic compound or a hydroxy group of a growing polymer chain. Further reaction of the ester-substituted phenolic hydroxy group leads to formation of the carbonate linkage. Thus, the ester-substituted phenol by-product of reaction of an ester-substituted diaryl carbonate with a dihydroxy aromatic compound may be incorporated into the main chain of a linear polycarbonate, for example.

Another structural feature which may be present in a biphenol polycarbonate copolymer product prepared via the melt transesterification polymerization reaction between an ester-substituted aromatic carbonate and a dihydroxy aromatic compound is the ester-linked terminal end group having structure (XIV)

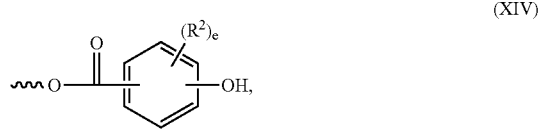
(XIV)

wherein $R^2$ and "e" are defined above.

Without wishing to be bound by any theory, it is believed that structure (XIV) may arise in the same manner as structure (XIII), but without further reaction of the hydroxy group of the ester substituted phenol that gives rise to structure (XIII). In the structures disclosed in the present disclosure, the wavy line represents the polycarbonate polymer chain structure.

End capping of the polymer chains formed during melt transesterification reactions such as those described herein, is partial. In an embodiment, the free hydroxy group content may be from 0 to 100 percent of the total number of end groups present in an embodiment, and from about 5 percent to 100 percent of the total number of end groups present in another embodiment. Although, not wishing to be bound by any theory, it is believed that polycarbonate oligomers formed during reactions that ultimately result in the formation of the biphenol polycarbonate copolymer product are not completely endcapped and possess both hydroxy end groups and aryloxy end groups. When the activated aromatic carbonate employed is an ester-substituted activated aromatic carbonate the polycarbonate oligomers formed during reactions which ultimately result in the formation of the biphenol polycarbonate copolymers may possess both hydroxy end groups and ester-substituted aryloxy end groups. In the preparation of polycarbonates the amounts of hydroxy end groups relative to the total number of end groups may be controlled. End groups identity and concentration may be varied by changing reaction conditions or by adding additional end-capping agents. In one embodiment, when the polycarbonate is prepared using the activated carbonate BMSC, ester-linked end group of structure (XV),

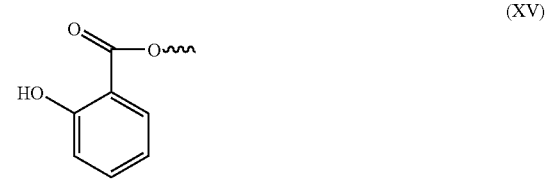
(XV)

which possesses a free hydroxy group may be present. The free hydroxy group present in the structure can take part in polycarbonate chain formation and copolymer formation.

In one embodiment, the oligomeric polycarbonate and/or the final copolymer product and/or the transparent articles produced from the copolymers may comprise an end group having structure (XVI)

(XVI)

The above-noted end group present in the oligomeric polycarbonate is typically linked to the rest of the polycarbonate chain via a carbonate linkage. As such, end groups comprising structure (XVI) represent activated carbonate moieties susceptible to reaction with the hydroxy groups of the biphenol and/or the aromatic dihydroxy compound. Useful end groups related to structure (XVI) include other salicyl groups, such as the ethylsalicyl, isopropylsalicyl, and butylsalicyl groups.

The biphenol polycarbonate copolymer products and articles made therefrom may further comprise structural units derived from at least one endcapping agent not derived from the activated aromatic carbonate. Suitable endcapping agents include phenol, and monoalkyl-substituted or monoaryl-substituted phenols, such as para-cumylphenol, para-cresol, and the like.

The biphenol polycarbonate copolymer products can be prepared in a batch or a continuous process. Any suitable reactor can be used. The reactor may be made of a metal, alloy, or it can be glass-lined. Suitable melt transesterification catalysts include alkali metal compounds, alkaline earth metal compounds, tetraorganoammonium compounds, tetraorganophosphonium compounds, and combinations comprising at least one of the foregoing catalysts.

Specific examples of alkali metal compounds or alkaline earth metal compounds include organic acid salts, inorganic acid salts, oxides, hydroxides, hydrides, and alcoholates of alkali metals and alkaline earth metals. Preferably, the catalyst is an alkali metal compound of the formula Met-$X_1$, wherein Met is selected from the group consisting of lithium, sodium, and potassium; and $X_1$ is selected from the group consisting of hydroxide and OAr, wherein Ar is a monovalent aromatic radical.

More specifically, examples of suitable alkali metal compounds include, but are not limited to, sodium hydroxide, potassium hydroxide, lithium hydroxide, calcium hydroxide, magnesium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, lithium salts of phenol, and the like.

Specific examples of alkaline earth metal compounds include, but are not limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, strontium stearate, and the like.

Exemplary tetraorganoammonium compounds include compounds comprising structure (XVII):

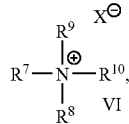

(XVII)

wherein $R^7$-$R^{10}$ are independently a $C_1$-$C_{20}$ alkyl radical, $C_4$-$C_{20}$ cycloalkyl radical or a $C_4$-$C_{20}$ aryl radical and $X^-$ is an organic or inorganic anion. Suitable anions ($X^-$) include hydroxide, halide, carboxylate, sulfonate, sulfate, carbonate and bicarbonate. In one embodiment, the transesterification catalyst comprises tetramethyl ammonium hydroxide.

In still other embodiments, the catalyst is a tetraorganophosphonium compound. Exemplary quaternary phosphonium compounds include compounds comprising structure (XVIII),

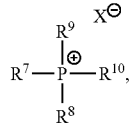

(XVIII)

wherein $R^7$-$R^{10}$ and $X^-$ are as previously described. Illustrative anions include hydroxide, halide, carboxylate, sulfonate, sulfate, carbonate, and bicarbonate.

Where $X^-$ is a polyvalent anion such as carbonate or sulfate it is understood that the positive and negative charges in structures (XVII) and (XVIII) are properly balanced. For example, when $R^7$-$R^{10}$ in structure (XVIII) are each methyl groups and $X^-$ is carbonate, it is understood that $X^-$ represents $\frac{1}{2}(CO_3^{-2})$ as will be appreciated by those skilled in the art.

Specific examples of tetraorganoammonium compounds and tetraorganophosphonium compounds include, but are not limited to tetramethylammonium hydroxide, tetrabutylammonium hydroxide, tetraethylphosphonium hydroxide, tetrabutylphosphonium acetate, tetrabutylphosphonium hydroxide, and the like.

In one embodiment, the catalyst comprises tetrabutyl phosphonium acetate. In an alternate embodiment, the catalyst comprises a mixture of an alkali metal salt or alkaline earth metal salt with at least one quaternary ammonium compound, at least one quaternary phosphonium compound, or a mixture thereof. For example, the catalyst may be a mixture of sodium hydroxide and tetrabutyl phosphonium acetate. In another embodiment, the catalyst is a mixture of sodium hydroxide and tetramethyl ammonium hydroxide.

In another embodiment, the catalyst comprises an alkaline earth metal salt of an organic acid, an alkali metal salt of an organic acid, or a salt of an organic acid comprising both alkaline earth metal ions and alkali metal ions. Alkali metal and alkaline earth metal salts of organic acids, such as for example, formic acid, acetic acid, stearic acid and ethylenediamine tetraacetic acid can also be used. In one embodiment, the catalyst comprises magnesium disodium ethylenediamine tetraacetate (EDTA magnesium disodium salt).

In yet another embodiment, the catalyst comprises the salt of a non-volatile inorganic acid. By "non-volatile" it is meant that the referenced compounds have no appreciable vapor pressure at ambient temperature and pressure. In particular, these compounds are not volatile at temperatures at which melt polymerizations of polycarbonate are typically conducted. The salts of non-volatile acids are alkali metal salts of phosphites; alkaline earth metal salts of phosphites; alkali metal salts of phosphates; and alkaline earth metal salts of phosphates. Suitable salts of non-volatile acids include $NaH_2PO_3$, $NaH_2PO_4$, $Na_2H_2PO_3$, $KH_2PO_4$, $CsH_2PO_4$, $Cs_2H_2PO_4$, or a mixture thereof. In one embodiment, the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

Any of the catalysts disclosed above may be used as combinations of two or more substances. Moreover, the catalyst may be added in a variety of forms. The catalyst may be added as a solid, as a powder, or it may be dissolved in a solvent, such as for example, in water or alcohol. The total catalyst composition is preferably about $1 \times 10^{-7}$ to about $2 \times 10^{-3}$ moles, and with about $1 \times 10^{-6}$ to about $4 \times 10^{-4}$ moles more preferred for each mole of the combination of the biphenol and the aromatic dihydroxy compound comonomer.

Any of the catalysts described above for use in polycarbonate melt transesterification reactions may be used in reactions involving activated carbonates. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that does degrade at a temperature used in the reaction (i.e., a "beta" catalyst). The total amount of catalyst employed is about $1 \times 10^{-7}$ to about $1 \times 10^{-2}$, and preferably about $1 \times 10^{-7}$ to about $2 \times 10^{-3}$ moles catalyst per total moles of the mixture of the biphenol and the aromatic dihydroxy compound employed. The activated aromatic carbonate is employed in an amount corresponding to between about 0.95 and about 1.08 moles per mole of a combination of the biphenol and the at least one dihydroxy aromatic compound.

In an embodiment, the copolymers and/or transparent articles disclosed herein can also be prepared using an extruder. The extruder may comprise at least one vent adapted for solvent removal. The polymerization feed for the extruder may be a mixture of the biphenol, the aromatic dihydroxy compound and the carbonic acid diester. The polymerization feed can also be a low molecular weight copolymer prepared by a preliminary reaction of the monomers. The preliminary reaction can be performed in a batch or a continuous process using a reactor. When an activated carbonic acid diester, such as BMSC is used, the preliminary reaction may be carried out at a temperature from about 100° C. to about 200° C. A molten mixture results initially, which upon being maintained at a temperature from about 100° C. to about 200° C. with agitation for a period of about 0.1 hours to about 10 hours results in a mixture having solid particles of the oligomeric polycarbonate copolymer.

In an embodiment, the mixture comprises crystals of an oligomeric polycarbonate. In an embodiment, the crystals of the oligomeric polycarbonate comprise structural units derived from the biphenol and the at least one aromatic dihydroxy compound other than the biphenol, in a ratio corresponding to the relative mole ratio of the biphenol and the aromatic dihydroxy compound. In other embodiments, the crystals comprise structural units derived from either the biphenol, the at least one aromatic dihydroxy compound, or predominantly the biphenol or the aromatic dihydroxy compound.

The liquid medium in the mixture comprises a solvent derived from the activated carbonic acid diester. For example, methyl salicylate is formed in the solvent medium when BMSC is used as the activated carbonic acid diester. In an embodiment, the mixture may comprise only the solvent derived from the activated carbonic acid diester.

The solvent portion of the mixture may further comprise from about 10 weight percent to about 99 weight percent of a solvent, and in another embodiment from about 30 weight percent to about 70 weight percent of the solvent. Non-limiting examples of suitable solvents include ester-substituted phenols, halogenated aromatic solvents, halogenated aliphatic solvents, non-halogenated aromatic solvents, non-halogenated aliphatic solvents, and mixtures thereof. Halogenated aromatic solvents are illustrated by ortho-dichlorobenzene (ODCB), chlorobenzene, and the like. Non-halogenated aromatic solvents are illustrated by toluene, xylene, anisole, phenol, 2,6-dimethylphenol, and the like. Halogenated aliphatic solvents are illustrated by methylene chloride, chloroform, 1,2-dichloroethane, and the like. Non-halogenated aliphatic solvents are illustrated by ethanol, acetone, ethyl acetate, cyclohexanone, and the like. In one embodiment, the solvent employed comprises a mixture of a halogenated aromatic solvent and an ester substituted phenol, such as for example, a mixture of ortho-dichlorobenzene (ODCB) and methyl salicylate. The mixture thus obtained can be pumped conveniently into an extruder where further polymerization is effected to produce the final biphenol polycarbonate copolymer, which can then be molded, if desired to produce transparent articles.

Typically, the amount of transesterification catalyst present during the reaction in the extruder will closely approximate the amount of catalyst used in the preliminary reaction step to form the oligomeric polycarbonate (also sometimes referred to as equilibration step).

In some instances it may be desirable to remove a portion of the ester-substituted phenol by-product formed during the equilibration of the reactants. This may be done conveniently by heating the reactants and the transesterification catalyst under vacuum, typically from about 0.01 atmospheres to about 0.9 atmospheres, and distilling off a portion of the ester-substituted phenol. As ester-substituted phenol is distilled from the mixture undergoing the equilibration reaction, the molecular weight of the polycarbonate will tend to increase. Thus, one aspect, a method comprises heating a mixture comprising the reactants in the presence of a transesterification catalyst at a temperature between about 100° C. and about 300° C., and a portion of the by-product ester substituted phenol is removed by distillation to provide a mixture comprising an ester substituted phenol, a transesterification catalyst, and a biphenol polycarbonate oligomer. In an embodiment, the oligomer comprises terminal ester substituted phenoxy carbonyl groups. In another embodiment, this mixture comprising the oligomer is fed to the devolatilizing extruder and extruded to provide a transparent article comprising the biphenol polycarbonate copolymer product As noted, in one embodiment an extruder is used to prepare copolymers and articles comprising the biphenol polycarbonate copolymers comprising greater than 45 mole percent of structural units derived from a biphenol. The extruder used according to one embodiment is preferably a devolatilizing extruder. That is, it is an extruder adapted for separating substantial amounts of solvent from a polymer-solvent mixture. Therefore the extruder must possess at least one, and preferably a greater number of vents adapted for solvent removal.

The devolatilizing extruder may be a single screw or multiple screw extruder. Typically, the devolatilizing extruder is operated at one or more temperatures in a range between about 100° C. and about 400° C., and at one or more screw speeds in a screw speed range, said range being between about 50 revolutions per minute (rpm) and about 1200 rpm, preferably between about 50 rpm and about 500 rpm. Devolatilizing extruders suitable for use according to the method of the present invention include co-rotating intermeshing double screw extruders, counter-rotating non-intermeshing double screw extruders, single screw reciprocating extruders, and single screw non-reciprocating extruders.

It is a general principle of extruder operation that as the feed rate is increased, a corresponding increase in the screw speed must be made in order to accommodate the additional material being fed. Moreover, the screw speed determines the residence time of the feed material being fed to the extruder. Thus, the screw speed and feed rate are typically interdependent. It is useful to characterize this relationship between feed rate and screw speed as a ratio. Typically the extruder is operated such that the ratio of starting material introduced into the extruder in pounds per hour to the screw speed expressed in rpm falls within a range of from about 0.01 to about 100, preferably from about 0.05 to about 5. For example, the ratio of feed rate to screw speed where a solution comprising the feed is being introduced at 1000 pounds per hour into an extruder being operated at 400 rpm is 2.5. The maximum and minimum feed rates and extruder screw speeds are determined by, among other factors, the size of the extruder, the general rule being the larger the extruder the higher the maximum and minimum feed rates.

In an embodiment, a method for producing a transparent biphenol polycarbonate copolymer comprises heating a monomer mixture comprising a biphenol, at least one aromatic dihydroxy compound other than the biphenol, and an activated carbonic acid diester in the presence of a transesterification catalyst, at a temperature in a range between about 100° C. and about 200° C. to provide a mixture comprising an oligomeric polycarbonate and a solvent derived from the activated carbonic acid diester. Then the biphenol polycarbonate copolymer product is heated to at least a sufficient temperature and for a sufficient period of time to render the biphenol polycarbonate copolymer product transparent upon cooling to room temperature, followed by cooling the biphenol polycarbonate copolymer product to produce the transparent article. Then the mixture is fed to an extruder comprising at least one vent adapted for solvent removal, and the mixture is extruded at one or more screw speeds in a range of from about 50 to about 1200 rpm to produce a biphenol polycarbonate copolymer comprising greater than 45 mole percent of structural units derived from the biphenol. Then the biphenol polycarbonate copolymer is heated to at least a sufficient temperature and for a sufficient period of time to render the biphenol polycarbonate copolymer product transparent upon cooling to room temperature, followed by cooling to produce the transparent article. The temperature at which the copolymer can be heated is greater than 340° C. in an embodiment, and greater than 350° C. in another embodiment. The time needed for the extrusion step and the subsequent heating step varies upon a number of factors, such as feed rate, polymerization rate, nature of the monomers, and the like. Generally, the extrusion step and the subsequent heating step to render the polycarbonate transparent can be carried out for a period of about 1 second to about 5 minutes in an embodiment, and from about 10 seconds to about 15 minutes in another embodiment. The process may also be carried out in the presence of an added end-capping agent, such as for example, para-cumylphenol, described above.

The mixture obtained from the preliminary reaction (described previously) is introduced into the upstream portion of the extruder barrel. The extruder is equipped with vents, which are connected to a manifold system, usually maintained under vacuum for removal of the ester-substituted phenol solvent and other volatile by-products formed during the formation of the final polycarbonate copolymer. The resulting BP polycarbonate copolymer is isolated as an extrudate, such as for example, in the form of transparent strands.

In some instances, it may be found that the copolymer product is of insufficient molecular weight, or retains too much solvent or other volatile by-products generated during the formation of the copolymer product. In such instances, the product obtained may be subject to a second extrusion on the same or a different devolatilizing extruder to furnish a copolymer product that typically has an increased molecular weight and a reduced level of residual solvent and/or volatile reaction by-products.

It is understood, especially for melt reactions of the type presented in the instant disclosure, that purity of the feed components, namely the monomers (the biphenol, the activated aromatic carbonate, and the dihydroxy aromatic compounds) and the biphenol polycarbonate oligomers, such as those having free hydroxy groups employed may strongly affect the properties of the oligomeric polycarbonate, the final copolymer product, and the final molded articles. Thus, it is frequently desirable that the feed components employed be free of, or contains very limited amounts of, contaminants such as metal ions, halide ions, acidic contaminants and other organic species. Typically the concentration of metal ions, for example iron, nickel, cobalt, sodium, and potassium, present in the monomer should be less than about 10 parts per million (ppm), preferably less than about 1 ppm and still more preferably less than about 100 parts per billion (ppb). The amount of halide ions, for example fluoride, chloride and bromide ions, should be minimized in order to avoid the corrosive effects of halide ion on equipment used in the preparation of the copolymer. Preferably, the level of halide ion present in each feed component employed should be less than about 1 ppm. The presence of acidic impurities, for example organic sulfonic acids, which may be present in bisphenols such as BPA, should be minimized since only minute amounts of basic catalysts are employed in the formation of the oligomeric polycarbonate and subsequent polymerization steps. Even a small amount of an acidic impurity may have a large effect on the rate of formation of the oligomeric polycarbonate copolymer and subsequent polymerization and article formation since it may neutralize a substantial portion of the basic catalyst employed. Lastly, the tendency of polycarbonates to degrade at high temperature, for example during molding, with concomitant loss of molecular weight and discoloration correlates generally with the presence of contaminating species within the polycarbonate copolymer. In general, the level of purity of a BP polycarbonate copolymer using a melt reaction method such as disclosed herein will closely mirror the level of purity of the starting feed components. Thus, care should be taken to minimize the level of contaminants in the monomer mixture as may be desired for different grades of biphenol polycarbonate copolymers.

Because, the transesterification catalyst is typically neither consumed in the equilibration step nor removed prior to extrusion, there is typically no need to add additional catalyst during extrusion.

The biphenol copolymers may optionally be compounded with any conventional additives used in thermoplastics applications, such as preparing molded articles. These additives include UV stabilizers, antioxidants, heat stabilizers, mold release agents, coloring agents, antistatic agents, slip agents, anti-blocking agents, lubricants, anti-clouding agents, coloring agents, natural oils, synthetic oils, waxes, organic fillers, inorganic fillers, and mixtures thereof. Typically, it is preferable to form a blend of the product copolymer and additives, which aid in processing the blend to form the desired molded article. The blend may optionally comprise from 0.0001 to 10 percent by weight of the desired additives, more preferably from 0.0001 to 1.0 percent by weight of the desired additives. In some instances, the copolymer products disclosed prepared as disclosed herein have low haze values and therefore high transparency. Without wishing to be bound by any limitation, transparency is a result of very low or no crystallinity present in the copolymers prepared as described in this disclosure. Low crystallinity, or conversely high amorphous character of the copolymers can be deduced from the cooling curve of their DSC trace. For example, referring again to the FIGURE, the DSC cooling curve (30) in the DSC trace shows no exotherm on cooling from the molten state, thus indicating that the copolymer does not readily crystallize on cooling, that is, it remains essentially amorphous. Further, it has been observed that the copolymer does not readily crystallize over a wide range of cooling rates, from about 2° C.-20° C. per minute. This aspect is useful in the application of these copolymers for preparing a variety of useful molded articles. Copolymers having a maximum melting temperature of from about 260° C. to about 350° C. can be prepared using the methods disclosed herein.

Molded articles, comprising the biphenol polycarbonate copolymer products may be obtained by conventional molding techniques, for example injection molding and compression molding. Melt processibility enables these copolymers to be processed using conventional molding equipment for preparing a variety of molded articles. The high melting temperature bestows other valuable properties, such as chemical resistance and/or solvent resistance, which makes them useful for producing articles useful in aeronautical and automotive under-the-hood applications, and storage medium for chemicals. Further, the copolymers disclosed herein are valuable for producing articles useful in the healthcare industry, such as, for example, packaging pharmaceutical and healthcare products, and producing medical devices. Some of the aforesaid applications may not require transparency (as described above), but require other performance properties, such as chemical resistance, ductility, and modulus; and the like. The copolymers disclosed herein can also be used for such applications.

The disclosure is explained in more detail with reference to the following non-limiting Examples, which are only illustrative, but not limitative.

EXAMPLES

Differential scanning calorimetric (DSC) analysis of the copolymer samples were done on a TA Instruments 2920 instrument using a pre-programmed temperature profile. The sample was heated over a range from 50° C.-360° C. at a given ramp rate (in ° C. per minute), held at 360° C. for 5 minutes, and then cooled back to 50° C. at a rate of 20° C. per minute. Cooling rates over a range from 2-20° C. per minute were used.

Carbon-13 nuclear magnetic resonance spectra of the biphenol polycarbonate copolymers were recorded on a 400-megahertz Fourier transform nuclear magnetic resonance spectrometer at a sample temperature of 80° C. Test samples were prepared by dissolving 300-400 milligrams of the copolymer in about 3 milliliters of deuterated 1,2-tetrachloroethane containing 35 milligrams of dissolved chromium acetylacetonate. Addition of chromium acetylacetonate facilitates faster relaxation of signals after each scan, thereby allowing for a linear response of the area under the peaks for the biphenol and dihydroxy aromatic compound structural units to the molar composition. A 30-degree flip angle pulse on carbon with inverse gated proton decoupling and a 5-second relaxation delay between scans was used to ensure quantitative analysis of spectra. Time domain signals were acquired, which were Fourier-transformed using an exponential window of 3-hertz line broadening applied across the entire spectrum.

Example 1

This Example describes a representative batch procedure used for preparation of a transparent biphenol polycarbonate copolymer using a glass tube reactor (which was capable of withstanding high temperatures and high vacuum) equipped with a mechanical stirrer. Mole ratio of the reactor charges for the monomers 4,4'-BP and BPA was 50:50, respectively. BMSC was used as the carbonic acid diester. The ratio of the moles of BMSC to the sum of the moles of 4,4'-BP and BPA was 1.02. Methyl salicylate, produced as a by-product of the transesterification reaction was removed under vacuum.

A glass reactor tube was soaked in 0.1 N hydrochloric acid overnight to passivate the walls of the reactor. The tube was then washed with de-ionized water a few times followed by Milli-Q water and acetone. The tube was then dried with air and charged with BMSC (20 grams, 0.0606 moles), 4,4'-BP (5.47 grams, 0.0294 moles), and BPA (6.72 grams, 0.0294 moles); followed by aqueous solutions of sodium hydroxide (containing $8.83 \times 10^{-8}$ moles of NaOH) and TMAH (containing $5.88 \times 10^{-6}$ moles of TMAH). The resulting mixture was then heated under ambient pressure to a $T_1$ temperature of 180° C. for a period of 5 minutes, then to a temperature of 200° C. for 10 minutes, and then finally to a $T_1$ temperature of 220° C. After the reaction charge had fully melted and become homogeneous, the stirrer was started. After a $t_1$ duration of 15 minutes at 220° C., the temperature was raised to a $T_2$ temperature of 280° C. and the pressure was gradually decreased to a $P_2$ pressure of 100 millibars. Within a few minutes, the thus far clear and transparent mixture began to show signs of whiteness or haziness. It was not possible to see the stirrer through the reaction mixture. After about 5 minutes, the reaction mixture became white and opaque. After a $t_2$ duration of 10 minutes at this temperature and pressure, the temperature was raised to a $T_3$ value of 325° C. and the pressure was reduced to a $P_3$ value of 100 millibars. After being allowed to proceed under this pressure and temperature for a $t_3$ duration of 5 minutes, the temperature was raised to a $T_4$ temperature of 350° C. and the pressure was reduced to a $P_4$ value of 0 millibar (as read with the pressure gauge that was attached to the reactor system). After a $t_4$ duration of about 15 minutes, the hazy (opaque) or white mixture started becoming a clear and transparent viscous mass. The reactor was brought back to ambient pressure and the contents were removed under gravity. The strands that were obtained were clear and transparent.

Comparative Example 1

The procedure of Example 1 was repeated except that after being heated at a $T_2$ temperature of 280° C. for a $t_2$ duration of 15 minutes, the reaction mixture was heated to a $T_3$ temperature of 310° C. for a $t_3$ duration of 5 minutes. The polycarbonate copolymer isolated as described above was an opaque material The experimental runs of Example 1 and Comparative Example 1 are shown in Table 1. Unless otherwise indicated, the ratio of moles of BMSC or DPC to total moles of the biphenol and aromatic dihydroxy compound monomers is 1.02. The symbol "*" indicates Comparative Example. In the case of the copolymer of Example 1, $^{13}C$ NMR spectroscopy showed a 50:50 relative mole ratio of 1,4-BP and BPA. The copolymer products obtained from Example 1 was clear and transparent.

TABLE 1

| Ex. No. | Relative mole percent of biphenol and aromatic dihydroxy compound monomers | | | $T_4/T_3$, (° C.) | $t_4$ or $t_3$, Time (min.) | $P_4$ (mbar) | Polymer clarity |
|---|---|---|---|---|---|---|---|
| | 1,4-HQ | BPA | 4,4'-BP | | | | |
| 1 | 0 | 50 | 50 | $T_4$, 340 | 12 | 0 | T |
| 1* | 0 | 50 | 50 | $T_3$, 310 | 15 | 0 | O |

"ND" stands for Not Determined; "T" stands for transparent; and "O" stands for opaque. The opaque samples could not be dissolved in the solvent used for NMR experiments.

The results in Table 1 show that transparent biphenol polycarbonate copolymers and articles having greater than 45 mole percent of 4,4'-BP structural units in the copolymer backbone can be prepared.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for producing a transparent article, the method comprising the steps of:
   melt transesterifying a monomer mixture in the presence of a transesterification catalyst, said monomer mixture comprising a biphenol, at least one aromatic dihydroxy compound other than the biphenol, and an activated carbonic acid diester to produce a biphenol polycarbonate copolymer product comprising greater than 45 mole percent of structural units derived from the biphenol;
   by heating the monomer mixture to a temperature of at least 350° C. to make the biphenol polycarbonate copolymer; and
   cooling the biphenol polycarbonate copolymer to produce the transparent article.

2. The method of claim 1, wherein the melt transesterification step comprises cooling the biphenol polycarbonate copolymer product to ambient temperature prior to said heating step.

3. The method of claim 1, wherein heating the monomer mixture is for a period of time from about 10 seconds to about 15 minutes.

4. The method of claim 1, wherein the biphenol polycarbonate copolymer product further comprises structural units derived from at least one aromatic dihydroxy compound other than the biphenol.

5. The method of claim 4, wherein the biphenol polycarbonate copolymer product further comprises less than 55 mole percent of structural units derived from the at least one aromatic dihydroxy compound other than the biphenol.

6. The method of claim 5, wherein the at least one aromatic dihydroxy compound is selected from the group consisting of bisphenol A, 2,2,2',2'-tetrahydro-3,3,3',3'-tetramethyl-1,1'-spirobi[1H-indene]-6,6'-diol, resorcinol, 2-phenyl-3,3-bis(4-hydroxyphenyl)-phthalimidine, 1,4-hydroquinone, 2-methyl-1,4-hydroquinone, and 1,1-bis(4'-hydroxy-3'methylphenyl) cyclohexane.

7. The method of claim 1, wherein the biphenol is selected from the group consisting of 4,4'-biphenol, 3,3'-dichloro-4,4'-dihydroxy-1,1'-biphenyl, 3,3'-difluoro-4,4'-dihydroxy-1,1'-biphenyl, and 3,3'-bis(trifluoromethyl)-4,4'-dihydroxy-1,1'-biphenyl.

8. The method of claim 1, wherein said melt transesterifying is carried out in an extruder.

9. The method of claim 1, wherein the activated aromatic carbonic acid diester has a structure:

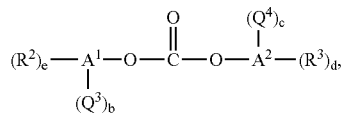

wherein $A^1$ and $A^2$ are each independently aromatic rings each having a number of positions available for substitution; $R^2$ and $R^3$ is independently at each occurrence a halogen, a cyano group, a nitro group, a $C_1$-$C_{20}$ alkyl group, a $C_4$-$C_{20}$ cycloalkyl group, a $C_4$-$C_{20}$ aromatic group, a $C_1$-$C_{20}$ alkoxy group, a $C_4$-$C_{20}$ cycloalkoxy group, a $C_4$-$C_{20}$ aryloxy group, a $C_1$-$C_{20}$ alkylthio group, a $C_4$-$C_{20}$ cycloalkylthio group, a $C_4$-$C_{20}$ arylthio group, a $C_1$-$C_{20}$ alkylsulfinyl group, a $C_4$-$C_{20}$ cycloalkylsulfinyl group, a $C_4$-$C_{20}$ arylsulfinyl group, a $C_1$-$C_{20}$ alkylsulfonyl group, a $C_4$-$C_{20}$ cycloalkylsulfonyl group, a $C_4$-$C_{20}$ arylsulfonyl group, a $C_1$-$C_{20}$ alkoxycarbonyl group, a $C_4$-$C_{20}$ cycloalkoxycarbonyl group, a $C_4$-$C_{20}$ aryloxycarbonyl group, a $C_2$-$C_{60}$ alkylamino group, a $C_6$-$C_{60}$ cycloalkylamino group, a $C_5$-$C_{60}$ arylamino group, a $C_1$-$C_{40}$ alkylaminocarbonyl group, a $C_4$-$C_{40}$ cycloalkylaminocarbonyl group, a $C_4$-$C_{40}$ arylaminocarbonyl group, and a $C_1$-$C_{20}$ acylamino group; "d" and "e" are independently integers from and including 0 to the number of positions available for substitution on $A^2$ and $A^1$ respectively; $Q^3$ and $Q^4$ are each independently activating groups selected from the group consisting of an alkoxycarbonyl group, a formyl group, a halogen atom, a nitro group, an amide group, a sulfone group, a sulfoxide group, and an imine group, an amidine group, aminocarbonyl and amidine moieties having structures

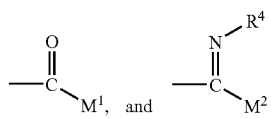

wherein $M^1$ and $M^2$ are independently N-alkyl, N,N-dialkyl, N-aryl, N,N-diaryl, or N-alkylaryl, N,N-dialkylaryl, and $R^4$ is an alkyl group or an aryl group; and "b" and "c" are independently integers from and including 0 to the number of positions available for substitution on $A^1$ and $A^2$ respectively, provided b+c is greater than or equal to 1.

10. The method of claim 1, wherein the activated aromatic carbonic acid diester is an ester-substituted diaryl carbonate having a structure

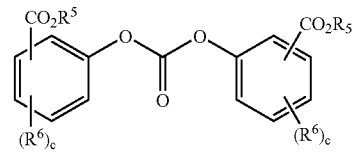

wherein $R^5$ is independently at each occurrence selected from the group consisting of an $C_1$-$C_{20}$ alkyl radical, a $C_4$-$C_{20}$ cycloalkyl radical, and a $C_4$-$C_{20}$ aromatic radical; $R^6$ is independently at each occurrence selected from the group consisting of a halogen, a cyano group, a nitro group, a $C_1$-$C_{20}$ alkyl radical, a $C_4$-$C_{20}$ cycloalkyl radical, a $C_4$-$C_{20}$ aromatic radical, a $C_1$-$C_{20}$ alkoxy radical, a $C_4$-$C_{20}$ cycloalkoxy radical, a $C_4$-$C_{20}$ aryloxy radical, a $C_1$-$C_{20}$ alkylthio radical, a $C_4$-$C_{20}$ cycloalkylthio radical, a $C_4$-$C_{20}$ arylthio radical, a $C_1$-$C_{20}$ alkylsulfinyl radical, a $C_4$-$C_{20}$ cycloalkylsulfinyl radical, a $C_4$-$C_{20}$ arylsulfinyl radical, a $C_1$-$C_{20}$ alkylsulfonyl radical, a $C_4$-$C_{20}$ cycloalkylsulfonyl radical, a $C_4$-$C_{20}$ arylsulfonyl radical, a $C_1$-$C_{20}$ alkoxycarbonyl radical, a $C_4$-$C_{20}$ cycloalkoxycarbonyl radical, a $C_4$-$C_{20}$ aryloxycarbonyl radical, a $C_2$-$C_{60}$ alkylamino radical, a $C_6$-$C_{60}$ cycloalkylamino radical, a $C_5$-$C_{60}$ arylamino radical, a $C_1$-$C_{40}$ alkylaminocarbonyl radical, a $C_4$-$C_{40}$ cycloalkylaminocarbonyl radical, a $C_4$-$C_{40}$ arylaminocarbonyl radical, and a $C_1$-$C_{20}$ acylamino radical; and c is independently at each occurrence is zero to a whole number to 4.

11. The method of claim 1, wherein said at least one activated aromatic carbonic acid diester comprises bismethylsalicyl carbonate.

12. The method of claim 1, wherein the biphenol polycarbonate copolymer article has a random arrangement of structural units derived from the biphenol and the at least one aromatic dihydroxy compound other than the biphenol.

13. A transparent article prepared according to the method of claim 1.

14. The transparent article of claim 13, comprising at least one end group derived from the activated aromatic carbonic acid diester.

15. The transparent article of claim 14, wherein said at least one end group indicative of the activated carbonic acid diester has a structure

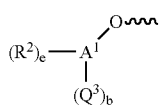

wherein $Q^3$ is an ortho-positioned activating group; $A^1$ is an aromatic ring, e is a natural numbers of 1 to the number of replaceable hydrogen groups substituted on the aromatic ring A; $R^2$ is a substituent group selected from the group consisting of alkyl, cycloalkyl, alkoxy, aryl, cyano, nitro, and halogen; b is a whole number of from 0 to the number of replaceable hydrogen groups on the aromatic ring minus e; and $Q^3$ is a radical independently selected from the group consisting of (alkoxycarbonyl)aryl groups, halogens, nitro groups, amide groups, sulfone groups, sulfoxide groups, or imine groups with structures:

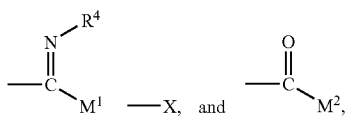

wherein X comprises halogen or $NO_2$, "e" is independently an integer from and including 0 to the number of positions available for substitution on $A^1$, $M^1$ and $M^2$ independently comprises N-alkyl, N-aryl, or N-alkyl aryl; $R^4$ comprises alkyl or aryl when b is 1; and b has a value of 0 or 1.

16. The transparent article of claim 15, wherein said at least one end group comprises a structure:

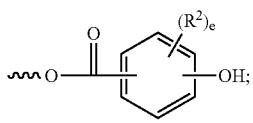

wherein $R^2$ is a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and e is a whole number of 1-4.

17. The transparent article of claim 15, wherein said at least one end comprises a structure:

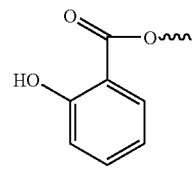

18. The transparent article of claim 15, comprising at least one internal ester-carbonate structural unit derived from the activated carbonic acid diester, and having a formula:

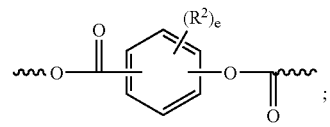

wherein $R^2$ is a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and e is a whole number of 1-4.

19. A method for producing a transparent article, the method comprising:

heating a monomer mixture in the presence of a transesterification catalyst at a temperature in a range between about 100° C. and about 200° C. to produce a mixture comprising biphenol polycarbonate oligomer and a solvent derived from the activated carbonic acid diester, wherein the monomer mixture comprises a biphenol, at least one aromatic dihydroxy compound other than the biphenol, and an activated carbonic acid diester;

feeding the mixture to an extruder;

extruding to produce a biphenol polycarbonate copolymer product comprising greater than 45 mole percent of structural units derived from the biphenol; and heating the biphenol polycarbonate copolymer product from 5 to 20° C. higher than a maximum melting point of the biphenol polycarbonate copolymer product for a period of time sufficient to render the copolymer product transparent upon cooling; and cooling the biphenol polycarbonate copolymer product to produce the transparent article.

20. The method of claim 19, wherein said extruding step comprises cooling the biphenol polycarbonate copolymer product to ambient temperature prior to said heating step.

21. The method of claim 19, wherein the biphenol polycarbonate copolymer product further comprises less than 55 mole percent of structural units derived from the at least one aromatic dihydroxy compound other than the biphenol.

22. The method of claim 19, wherein said monomer mixture further comprises a chain stopper.

23. The method of claim 19, wherein the period of time is from 1 second to about 5 minutes.

24. The method of claim 19, wherein the transparent article has a random arrangement of structural units derived from the biphenol and the at least one aromatic dihydroxy compound other than the biphenol.

25. A method for producing a biphenol polycarbonate copolymer, the method comprising the steps of:

melt transesterifying in the presence of a transesterification catalyst, a monomer mixture, said monomer mixture comprising a biphenol, at least one aromatic dihydroxy compound other than the biphenol, and an activated carbonic acid diester to produce a biphenol polycarbonate copolymer product comprising greater than 45 mole percent of structural units derived from the biphenol by heating the monomer mixture to a temperature of greater than 350° C. to make a biphenol polycarbonate copolymer, and cooling the biphenol polycarbonate copolymer.

26. A biphenol polycarbonate copolymer produced in accordance with the method of claim 25.

27. The biphenol polycarbonate copolymer of claim 26, comprising greater than 55 mole percent of structural units derived from the biphenol.

* * * * *